(12) United States Patent
Bessho et al.

(10) Patent No.: US 7,473,391 B2
(45) Date of Patent: Jan. 6, 2009

(54) METHODS FOR MAKING MOLDING MATERIAL, MOLDED BODY, AND SINTERED BODY

(75) Inventors: Yuki Bessho, Nishikasugai-gun (JP); Hiroyuki Shindo, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 10/095,118

(22) Filed: Mar. 12, 2002

(65) Prior Publication Data
US 2002/0175440 A1 Nov. 28, 2002

(30) Foreign Application Priority Data
Mar. 13, 2001 (JP) .......................... P2001-070974
Jan. 15, 2002 (JP) .......................... P2002-005960

(51) Int. Cl.
C04B 35/624 (2006.01)
C04B 35/63 (2006.01)
(52) U.S. Cl. ..................... 264/621; 264/28; 264/669
(58) Field of Classification Search ................ 264/621, 264/669, 28
See application file for complete search history.

(56) References Cited

U.S. PATENT DOCUMENTS

| 4,734,237 A | 3/1988 | Fanelli et al. | 264/122 |
| 5,250,251 A | 10/1993 | Fanelli et al. | 264/328 |
| 5,286,767 A | 2/1994 | Rohrbach et al. | 524/27 |
| 5,447,894 A | 9/1995 | Yasuoka et al. | 501/152 |

FOREIGN PATENT DOCUMENTS

| JP | 04-083752 | 3/1992 |
| JP | 07-138064 | 5/1995 |
| JP | 07-277814 | 10/1995 |
| JP | 2604592 | 1/1997 |
| JP | 2000-255022 | 9/2000 |
| JP | 3105225 | 9/2000 |
| WO | WO 93/04011 | 3/1993 |

OTHER PUBLICATIONS

Roget's II—The New Thesaurus (1988) Houghton Mifflin Company, (Expanded ed.) pp. 180, 357, 578 and 648.*
Grant & Hackh's Chemical Dictionary (1991) 5th ed. McGraw-Hill, p. 147.*
Perry (1984) "Chemical Engineers' Handbook" fifth ed. Mc Graw-Hill, pp. 19-25 and 19-26.*

* cited by examiner

Primary Examiner—John Hoffmann
(74) Attorney, Agent, or Firm—Burr & Brown

(57) ABSTRACT

A method of manufacturing a sintered body is provided. A molding powder, a gel-forming material powder and a solvent are mixed at a temperature not higher than a dissolving point of the gel-forming material. A treatment of pulverizing agglomerates containing the molding powder, gel-forming material powder and solvent absorbed in the gel-forming material powder is carried out. The mixture is then heated to a temperature not lower than the dissolving point thereby forming a sol. The sol is then cooled to a temperature not higher than the gel point, thereby forming a molding material. The molding material is used for producing a sintering body.

5 Claims, 3 Drawing Sheets

METHODS FOR MAKING MOLDING MATERIAL, MOLDED BODY, AND SINTERED BODY

BACKGROUND OF THE INVENTION

1. Field of the Invention

This invention relates to a method of manufacturing a molding material, a method of manufacturing a molded body, a method of manufacturing a sintered body, a molding material, a molded body and a sintered body that can be utilized for ceramics or powder metallurgy.

2. Related Art Statement

Aqueous injection molding technique using agar has been known in the fields of ceramic powder molding and powder metallurgy. Particularly, in the injection molding method of ceramic powder, it has been known to mold a ceramic powder by using a binder constituted with water and agar. For example, in Japanese Patent No. 2604592 (U.S. Pat. No. 4,734,237), a basic patent in the relevant field, a metal powder or ceramic powder, an agaroid gel-forming material and water are mixed, and the mixture is heated to a temperature exceeding the gel point of the agaroid gel-forming material. The mixture is then molded at a temperature lower than the gel point thereby obtaining a molded body comprising the ceramic powder or metal powder. For example, an aqueous agar solution is admixed to a mixture of an alumina powder and deionized water, the mixture is mixed under heating at 77° C. and injection molded, and the resultant molded body is sintered at 1600° C. Further, Japanese Patent No. 3105225 (U.S. patent application Ser. No. 748,151: PCT/US92/06799) also discloses a similar manufacturing method.

SUMMARY OF THE INVENTION

The present inventors have made a study, based on the patents described above, for obtaining a molded body of a complicate shape and its sintered body by the injection molding method. In the course of the study, it was observed that scattering was caused in the strength of the sintered body or the strength of the sintered body was lowered depending on the conditions. When the sintered body showing a low strength was analyzed and studied, it was found that lowering in the relative density was extremely small. Further, in the relevant field of the art using agar and water as the binder, the amount of agar is extremely small compared with those of conventional resin binders or wax binders. In addition, in the course of elevating the temperature of the molded body, since agar is easily released together with water, it is considered that no special degreasing step is required. That is, in the technique of using agar and water as the binder, it would be unlikely that remarkable lowering of the strength in the sintered body is caused depending on mixing, molding and degreasing conditions, and the cause therefore was unknown. Since ceramics are brittle, it is desirable to increase the strength in view of avoiding the risk leading to fracture.

An object of this invention is to improve the strength of a sintered body upon manufacturing of the sintered body from a molding powder by using a gel-forming material as a binder.

Further, another object of this invention is to improve the strength of a sintered body and suppress scattering in the strength upon manufacturing the sintered body from a molding powder while using a gel-forming material as a binder.

This invention provides a method of manufacturing a molding material. The method comprises the steps of;

mixing at least a molding powder, a powder of a gel-forming material and a solvent at a temperature not higher than a dissolving point of the gel-forming material to provide a mixture, while applying a treatment of pulverizing agglomerates containing the molding powder, the powder of said gel-forming material and the solvent absorbed in the material;

heating the mixture to a temperature not lower than the dissolving point while kneading said mixture to form a sol; and cooling the sol to a temperature not higher than a gel point of the gel-forming material.

Further, in the molding method according to this invention, a molded body comprising the molding material is obtained. Specifically, the molding product is obtained by filling or supplying the molding material into a predetermined mold, and molding the same in the mold. Alternatively, the molded body is obtained by cooling the sol in the mold. Further, this invention also provides a method of obtaining a sintered body by sintering the molded body.

As has been described above, the present inventors have made a detailed study over the entire process for manufacturing the sintered body for the reason that the strength of the sintered bodies is lowered while the density of the sintered body is relatively high and have attained the following knowledge. That is, a molding powder, a gel-forming material, for example, an agar powder and a solvent were mixed at a room temperature and the resultant mixture was heated to a temperature not lower than the dissolving point of the gel-forming material, which was fluidized and kneaded. When the mixed slurry is observed closely, inhomogeneous suspensions were observed on the surface of the slurry. Further, after discharging the slurry out of the mixing vessel, adhesion of agglomerates was observed on the inner wall surface of the mixing vessel. The adhesion of the agglomerates on the inner wall surface of the mixing vessel were scraped off into the slurry and mixing was tried again, but the agglomerates were suspend again and adhered on the inner wall surface of the mixing vessel.

When suspensions or adhesion on the inner wall surfaces were closely studied microscopically, it was found that a number of molding powders were firmly bonded by agar and agglomerated. Although the reason is not apparent at present, it may be estimated as below. That is, agar powder has an extremely small water content and has a property of rapidly absorbing water to the inside of the powder and swells while including water. When the agar powder is charged into a slurry, it abruptly absorbs water in the vicinity of the agar powder. In the field of the relevant art, the water content is generally small while the amount of the molding powder is large in a slurry. Therefore, when water in the vicinity of the agar powder is absorbed rapidly, the water content is locally lost at the periphery thereof to agglomerate the molding powder. It is considered that agar just after absorbing water performs as a binder in the inside of the agglomerates, resulting in strong agglomeration.

Based on the findings described above, the present inventors have adopted a process comprising the steps of mixing a molding powder, a gel-forming material powder and a solvent at a temperature not higher than the dissolving point of the gel-forming material and applying treatment of pulverizing agglomerates containing the molding powder, the gel-forming material powder and the solvent absorbed in the gel-forming powder and then heating and kneading the mixture at a temperature not lower than the dissolving point of the gel-forming material. As a result, the strength of the sintered body was improved. Further, it has been found that scattering of the strength of the sintered body is reduced.

Further, the present inventors have also made a study for sufficiently dissolving the gel-forming material, for example, agar by increasing the amount of a solvent, for example, water and using a great amount of water upon mixing the gel-forming material and the molding powder. That is, it has been attempted to suppress formation of agglomerates by supplying a sufficiently great amount of water even when agar rapidly absorbs water. However, since agar rapidly absorbs water to firmly adhere a fine molding powder at the periphery of agar particles, it is necessary to use a great amount of water. This extremely increases the water content in the mixture. However, since water in the mixture has to be removed in the subsequent drying step, this is extremely time and energy consuming in the drying step. According to this invention, since a sintered body of a high strength can be manufactured without increasing the cost in the drying step, it is useful for the reduction of the cost.

Further, this invention provides a method of manufacturing a molding material. The method comprises the steps of:

mixing at least a molding powder, a powder of a gel-forming material and a solvent at a temperature not higher than a dissolving point of the gel-forming material to obtain a mixture, the powder of the gel-forming material requiring 50 minutes or more of time to increase the weight by 5% when the powder is maintained in an atmosphere at a temperature of 30° C. and at a relative humidity of 100%;

heating and kneading the mixture at a temperature not lower than the dissolving point to form a sol; and obtaining a molding material form the sol.

Further, this invention provides a method of manufacturing a molded body comprising the steps of mixing at least a molding powder, a gel-forming material powder and a solvent at a temperature not higher than the dissolving point of the gel-forming material powder thereby obtaining a mixture, the gel-forming powder used requiring 50 minutes or more of time to increase the weight by 5% when the gel-forming material powder is maintained in an atmosphere at a temperature of 30° C. and at a relative humidity of 100%, then heating and kneading the mixture at a temperature not lower than the dissolving point thereby forming a sol, then forming a molding material from the sol, and then molding the molding material thereby obtaining a molded body. This invention also provides a method of manufacturing a sintered body by sintering the molded body described above.

Further, this invention also provides a molding material, a molded body and a sintered body obtained, respectively, by the methods described above.

As has been described above, the present inventors have made a detailed studied over the entire process of manufacturing the sintered body for the reason that the strength of the sintered body is lowered while the density of the sintered body is relatively high and have obtained the following knowledge. That is, a molding powder, a gel-forming material, for example, an agar powder and a solvent were mixed at a room temperature, the resultant mixture was heated to a temperature not lower than the dissolving point of the gel-forming material to be fluidized and then kneaded. In this process, when mixed slurry was observed closely, inhomogeneous suspensions were suspended on the surface of the slurry. Further, after discharging the slurry from a mixing vessel, adhesion of the agglomerates was observed on the inner wall surface of the mixing vessel. Agglomerates adhered on the inner wall surface of the mixing vessel were scraped off into the slurry and mixing was tried again but it was found that the agglomerates were suspended again and adhered on the inner wall surface of the mixing vessel.

When the suspensions or the adhesion on the inner wall surface were microscopically observed specifically, it was found that a number of molding powders were firmly bonded by agar and agglomerated. Although the reason is not apparent but it may be estimated as below. That is, the agar powder is highly water absorbing, and has a property of rapidly absorbing the water content to the inside of the agar powder and swelling with inclusion of water. When the agar powder is charged into a slurry, it rapidly absorbs water in the vicinity of the agar powder. In the field of the relevant art, the water content is relatively small, while the amount of the molding powder is large in the slurry. Therefore, when water in the vicinity of the agar powder is absorbed rapidly, water is locally deprived at the periphery thereof to agglomerate the molding powder. It is considered that agar just after absorption performs as the binder in the inside of the agglomerates, resulting in strong agglomeration.

Further, the present inventors have also made a study for sufficiently dissolving the gel-forming material, for example, agar in mixing the gel-forming material and the molding powder by increasing the amount of the solvent, for example, water and using a great amount of water. That is, it has been attempted to suppress the formation of agglomerates by using a great amount of water even when agar rapidly absorbs water. However, since agar rapidly absorbs water and a fine molding powder is firmly adhered around the agar particles, it is necessary to use a great amount of water. Therefore, the water content in the mixture is extremely large. However, since water in the mixture has to be removed in the subsequent drying step, this results in an enormous loss of time and energy in the drying step.

The present inventors have found that the inhomogenity of the molded body and the low strength of the sintered body, due to the agglomeration of the molding powder upon mixing, can be suppressed by using such a gel-forming material powder having a lower initial solvent absorption speed upon mixing into the solvent as requiring 50 minutes or more of time to increase the weight by 5% when the material is maintained in an atmosphere at a temperature of 30° C. and at a relative humidity of 100% and have accomplished the present invention.

In this invention, a gel-forming material powder requiring 50 minutes or more of time to increase the weight by about 5% based on the initial weight when the material is maintained in an atmosphere at a temperature of 30° C. and at a relative humidity of 100% is used and mixed with the molding powder and the solvent. The necessary time is preferably 50 minutes or more with a view point of this invention and most preferably 250 min or more. The upper limit of the necessary time has no particular restriction in view of the invention.

PREFERRED EMBODIMENTS OF THE INVENTION

Figure 1:
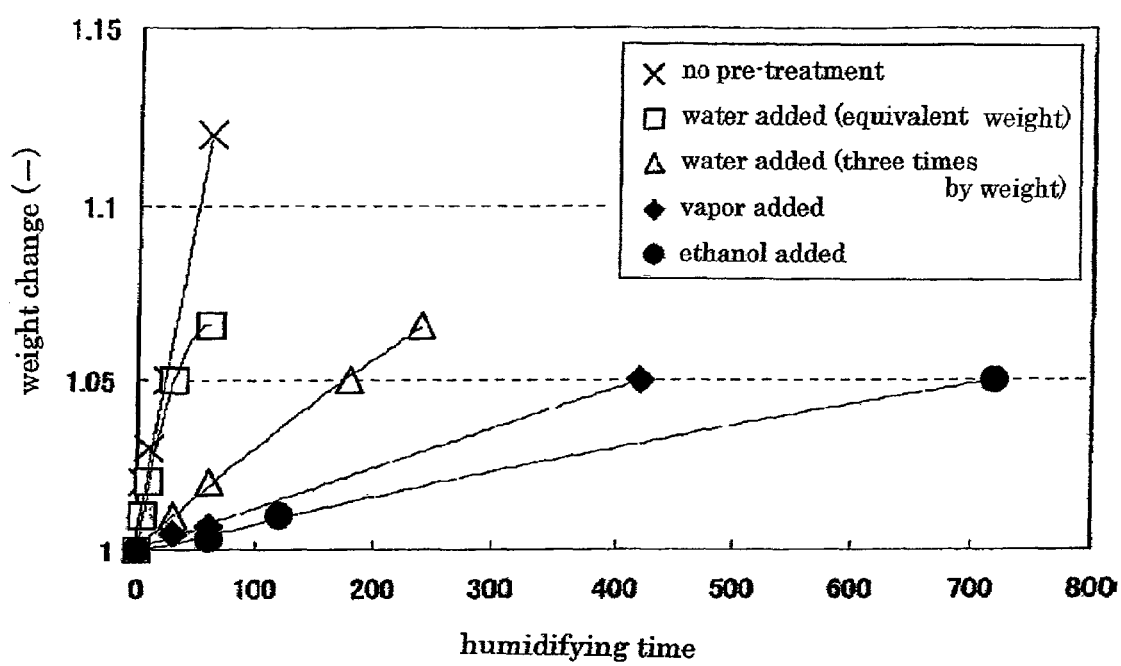
FIG. 1 is a graph showing a relation between the humidifying time and the change of weight when agar powder was put to various pre-treatments.

This invention is to be explained more in details. There is no particular restriction on the molding powder as an object of this invention so long as the powder may be sintered by heating to form a sintered body. Further, it is preferred that the molding powder is not dissolved into a solvent or does not react with a solvent. The molding powder is preferably an inorganic powder and it is particularly preferably an inorganic powder intended to be used for sintering. The inorganic powder can include, typically, ceramic powder, metal powder, a powder of ceramic-metal composite material and a powder mixture thereof. The ceramics can include, for example, oxide series ceramics such as, for example, alumina, zirconia, titania, silica, magnesia, ferrite, cordielite and oxides of rare elements such as yttria; composite oxides such as barium titanate, strontium titanate, lead zirconate titanate, manganites of rare earth elements and chromites of rare earth elements; nitride series ceramics such as aluminum nitride, silicon nitride and sialon; and carbide series ceramics such as silicon carbide, boron carbide, and tungsten carbide. Further, the metal can include, for example, iron series metals such as iron, stainless steel and carbonyl iron, non-iron metals such as titanium, copper and aluminum or alloys of non-iron metals. The inorganic powder can further include graphite, glass and carbon. Further, the molding powder other than the inorganic powder can include, for example, resin powders.

When the molding powder is mixed with the solvent and the gel-forming material, the molding powder tends to agglomerate more intensely at the periphery of gel-forming material particles when the solvent is deprived from the periphery of the gel-forming material as the grain size of the molding powder is smaller (the grains are smaller). Accordingly, this invention is particularly useful in a case where the average particle size of the molding powder is small. In view of the above, the average particle size of the molding powder is 10 µm or less in a preferred embodiment and 1 µm or less in a further preferred embodiment.

There is no particular restriction on the lower limit for the average particle size of the molding powder in view of the invention. It can be 0.1 µm or more with an economical view point, with no particular restriction thereto.

A gel-forming material is such a material as forming a flowable sol upon heating to a temperature not lower than the dissolving point and then forming a gel upon cooling the sol to a temperature not higher than the gel point. As described in Japanese Patent No. 2604592, the gel-forming material having a gel strength of at least 500 g/cm$^2$ at a temperature between 0 - 22° C. is preferred. In a preferred embodiment, the gel-forming material forms a sol at a temperature not lower than the dissolving point and forms a gel at a temperature not higher than the gel point reversibly.

Particularly preferably, the gel-forming material is a natural or synthetic hydro-colloid. The hydro-colloid can include, for example, polysaccharides such as agar, carrageenan, furcellaran, alginic acid and derivatives thereof, Azotobactor-vinelandii-gum, gellan gum (deacyl type or native type), pectin, curdlan, starch and derivatives thereof, psyllium seed gum; and proteins such as gelatin, chitin, chitosan and modified milk protein. Further, it can include gel-forming materials with addition of at least one of locust bean gum, tara bean gum, casia gum, guar gum, fenugreek gum, konyac mannan (also including purified glucomannan), xanthan gum, tamarind gum, locust, gum arabic, arabino galactan, crystalline cellulose, sodium cellulose glucolate, methyl cellulose, gum ghatti, almond gum, welan gum, tragancanth gum, pllulan, and soy bean polysaccharides.

In a particularly preferred embodiment, polysaccharides having galactose as the basic skeleton are used. The polysaccharide may preferably be an agaroid gel-forming material. The agaroid gel-forming material include all the agaroid gel-forming materials and includes not only agarose at high purity but also agar at low purity containing a great amount of an agaroid pectin ingredient and also includes modified agar. Pure agar is referred to as agarose, which is a neutral polysaccharide comprising β-D-galactopyranose bonded at the 1,3-positions and 3,6-anhydro-L-garactopyranose bonded at the 1,4-positions as repeating units. Further, the agaroid gel-forming material may also include derivatives of agarose. Agarose partially containing sulfate esters, methoxyl and pyruvic acid are referred to as agaropectin. Most of commercial agars are mixtures of agarose and agaropectin.

In a case where agarose and agarose derivatives (typically agaropectin) are contained in the agaroid gel-forming material, the ratio of agarose and agarose derivative may be varied depending on the aimed application use. The agarose derivative contains ashes such as sodium, potassium, calcium and sulfuric acids. Therefore, it is preferred that the amount of the agarose derivative is smaller in such application use as fine ceramics, in which impurities should be avoided. Specifically, agarose at high purity with an ash content of 2% by weight or less is preferred and with an ash content of 1% by weight or less is particularly preferred.

The solvent used herein is those for the gel-forming material that dissolve the gel-forming material powder, form a sol upon heating and form a gel upon lowering of the temperature. As the solvent, water is particularly preferred but it may be a hydrophilic organic solvent such as alcohols or a mixture of water and a hydrophilic organic solvent. The hydrophilic organic solvent preferably includes alcohols such as methanol, ethanol and propanol, and alcohols substituted with chlorine or bromine atoms. This may be presumed that an alcohol penetrates into molecules of agar and, further, causes swelling by substitution with water, so that it no more absorbs water rapidly and less forms agglomerates.

In the mixing step of the mixture, existence of the agglomerates can be confirmed by passing the mixture after mixing through a screen with a wire diameter of 390 µm and a mesh of 600 µm (JIS Z8801) and observing the presence of residues on the screen. Further, whether the agglomerates have been pulverized or not in the mixture can be confirmed by passing the mixture after pulverization through a screen with a wire diameter 390 µm and a mesh of 600 µm (JIS Z8801) and measuring the amount of residues on the screen.

The amount of the residues when the mixture after pulverization is passed through the screen in this invention is preferably 0.4 parts by weight or less, further preferably, 0.2 parts by weight or less and, particularly preferably, 0.1 parts by weight or less based on 100 parts by weight of the molding powder. For the measurement for the amount of the residues it is tested as below. That is, 100 parts by weight of a molding powder, 27.4 parts by weight of a solvent, 3 parts by weight of a gel-forming material and one part by weight of a dispersant (40% solution of ammonium polyacrylate polymer) are mixed. After the mixing, the mixture is passed through the screen described above and the weight ratio of the residues remaining on the screen is measured.

Whether a certain treatment constitutes a pulverization treatment or not can be determined depending on the ratio between the residual amount of the agglomerates on the screen when the treatment was applied upon mixing and the residual amount of the agglomerates on the screen when the treatment was not applied upon mixing. It is necessary that the residual amount is reduced at least to 50% or less by applying the treatment and, preferably, it is reduced to 20% or less, further preferably, 15% or less and, particularly preferably to 5% or less. So long as the condition is satisfied, there is no particular restriction for the concrete method of the pulverizing treatment. For example, it may be considered a method of cutting or disconnecting the agglomerates in the mixture by a cutting mechanism such as a chopper blade, as well as a method of crushing the agglomerates or providing the mixture with flow, thereby colliding the agglomerates to each other to decompose them.

Since the agglomerates are relatively firm, they are less pulverized by flowing and stirring a mixture slurry of mixture by a usual mixing process. Therefore, it is preferred to provide a cutting mechanism for cutting the agglomerates in the slurry. Particularly preferably, a mixing vessel is provided with a flowing mechanism for circulating and flowing the slurry and a cutting mechanism for cutting agglomerates contained in the slurry during flowing. There are no particular restrictions on the flowing and cutting mechanisms. Preferably, the flowing mechanism is a stirring mechanism for stirring the slurry in the mixing vessel, including a blade, stirrer or the like. A planetary blade is particularly preferred. Further, the flowing mechanism may be a pipeline for flowing the slurry in the mixing vessel.

The slurry of mixture during movement under flowing is passed in front of the cutting mechanism disposed in the flow channel to disconnect the agglomerates. The cutting mechanism is preferably a cutting blade or cutting tooth, and a chopper blade is, particularly preferred. A mixing vessel provided with such stirring mechanism and cutting mechanism can include, for example, high speed dispersing machines "T. K. Homodisper", "T. K. Homojetter", "T. K. Pipeline Homomixer" and "T. K. Highvismix" (manufactured by Tokushu Kika Kogyo K. K.).

In view of the efficient pulverization, the rotation speed of the cutting blade or the cutting tooth is preferably 500 rpm or more and, further preferably, 1000 rpm or more.

However, when the rotation speed is excessively high, cost of the apparatus is increased and metal impurities may possibly intrude into the products by the abrasion of the blade. In view of the above, the rotation speed of the cutting blade or the cutting tooth is preferably 5000 rpm or less and, further preferably, 3000 rpm or less.

The temperature upon mixing of the molding powder, the gel-forming material and the solvent is not higher than the dissolving point of the gel-forming material. The dissolving point of the gel-forming material is such a temperature that the gel-forming material dissolves into the solvent to form a sol when the gel-forming material and the solvent are mixed and then the temperature is elevated. Accordingly, the dissolving point may vary even for an identical gel-forming material when the solvent is different. In this invention, it is particularly preferred that mixing is conducted at a temperature somewhat lower than the dissolving point and, it is preferred to conduct mixing, for example, at a temperature lower by at least 30° C. than the dissolving point and, further preferably, lower by at least 50° C. than the dissolving point. When the gel-forming material is of agaroid, the mixing temperature is preferably 50° C. or lower and, further preferably 40° C. or lower.

Then, the mixture of the molding powder, the gel-forming material and the solvent is heated and kneaded at a temperature not lower than the dissolving point of the gel-forming material to form a sol and then the sol is cooled to a temperature not higher than the gel point of the gel-forming material, thereby forming a molding material.

During heat kneading, the mixture is heated to a temperature not lower than the dissolving point simultaneously with kneading to obtain a flowable sol. The heating temperature is different depending on the kind of the gel-forming material and it is, preferably, 85 to 120° C. in a case of the agaroid gel-forming material. At a temperature of 100° C. or higher, it is preferably pressurized in order to avoid boiling of water. Then, a molding product of a desired shape can be obtained by cooling the heat-kneaded product in a mold. Alternatively, a molding material is obtained by cooling the heat-kneading product and then the molding material is supplied into a mold, to obtain a molded body.

In a preferred embodiment, the molding material is pelleted and, simultaneously, the water content of the pellet is controlled within a certain range. The pellet after controlling the water content is injected into an injection molding die to obtain a molded body. However, other molding methods, for example, a casting method or an extrusion molding method may also be used.

In the mixture of this invention, the amount of the gel-forming material powder based on 100 parts by weight of the molding powder is preferably 1 part by weight or more and, further preferably, 3 parts by weight or more. This further increases the strength of the molded body. Further, the strength of the molded body can further be increased by using the gel-forming material having a high gel strength as described above.

Further, the amount of the gel-forming material powder based on 100 parts by weight of the molding powder is preferably 10 parts by weight or less and, further preferably, 7 parts by weight or less. Since this decrease the amount of water deprived from the slurry of the mixture upon mixing the gel-forming material powder, micro-cracks formed in the sintered body can be suppressed effectively.

In the mixture of this invention, the amount of the solvent based on 100 parts by weight of the molding powder is preferably 40 parts by weight or less and, further preferably, 30 parts by weight or less. This reduces the cost in the drying step. By decreasing the amount of the solvent, formation of the agglomerates described above becomes remarkable to enhance the effect of this invention. On the other hand, with a view point of enabling the mixing effectively in a short period of time and increasing the strength of the sintered body, the amount of the solvent based on 100 parts by weight of the molding powder is preferably 40 parts by weight or more and, further preferably, 50 parts by weight or more.

The gel-forming material powder having the hygroscopic property described above can be prepared by applying a treatment to an appropriate commercially available starting material powder for suppressing the rapid absorption of the solvent. There are no particular restrictions on the kind and the shape of the starting material powder and the shape can include powdery, flaky, granular, network-like or other special shapes. Further, when the gel-forming material is agar, it may be agar prepared from Gelidum amansii Lamuroux, Pterocladia tenuis Okamura, Acantholpeltis japonicum Okamura, G. conferoides Papen., thymi Campylaephora hypnaeoides Okamura, Ceramium boidenii Gepp. and Eucheuma muricaum Weber van Bosse.

As the treatment for suppressing rapid absorption of the solvent, the following treating methods are preferred.

(1) Water, a hydrophilic solvent or a mixed solvent of water and the hydrophilic solvent is added to the gel-forming material powder. The hydrophilic solvent can include, preferably, alcohols such as methanol, ethanol and propanol, and alcohols substituted with chlorine or bromine atoms.

In this case, water, the hydrophilic solvent or the mixed solvent can be sprayed to the gel-forming material powder. Preferably, water, hydrophilic solvent or mixed solvent is sprayed to the starting powder for the gel-forming material after spreading the same on a plane. Further, the starting powder for the gel-forming material can be kept in a highly humid atmosphere. In this case, the relative humidity is preferably 80% or higher and the temperature is preferably 10 to 30° C. in the atmosphere. Particularly preferably, the powder is humidified by being kept in an atmosphere at a temperature of 30° C. and at a relative humidity of 100%.

(2) The gel-forming material powder is coated with a water soluble polymer. For example, an agar powder is immersed in an aqueous solution of a water soluble polymer such as polyvinyl alcohol or polyethylene glycol. After solid-liquid separation by filtration, the agar powder is dried.

EXAMPLES

Example 1

As an alumina powder, 6000 g of an easily sinterable low soda alumina content powder ("AES-11", manufactured by Sumitomo Chemical Industry Co., purity: 99.5%, BET specific surface area: 7 m$^2$/g, average particle size: 0.5 μm) was used. As a dispersant, one part by weight of ammonium polyacrylate copolymer ("A-6114", manufactured by Toa Gosei Co., molecular weight: 10000 MW, pH: 7-9, 39-41% solution) was added based on 100 parts by weight of the alumina powder, ion exchanged water was added so as to adjust the water content to 21.5 parts by weight and mixed thoroughly. Then, the mixture was pulverized for 5 hours in a pot mill using nylon balls as pulverization media. The resultant slurry was passed through a screen having a wire diameter of 390 μm and a mesh of 600 μm (JIS Z8801) and then placed in a mixing vessel. As a mixing vessel, "T. K. Highvismix" (manufactured by Tokushu Kika Kogyo K. K.) was used. The mixing vessel was provided with a planetary blade (twisted blade) and a chopper blade.

Powdered agar ("XG89", manufactured by Ina Shokuhin Kogyo K. K. having gel strength of 840 g/cm$^2$) was weighed at a ratio of 3 parts by weight based on 100 parts by weight of the alumina powder. While stirring the mixture, the agar powder was charged stepwise into the mixing vessel. 5 min after charging the entire amount of the weighed agar powder, the lid of the mixing vessel was opened, solid adhesion on the planetary blade, on the chopper blade and on the inner wall surface were scraped into the slurry and then mixed again for 5 min. The resultant slurry was passed through a screen having a wire diameter of 390 μm and a mesh of 600 μm (JIS Z8801), and the weight of the solids remaining on the screen was measured. The solids were agglomerates. The rotation speed for the planetary blade and the rotation speed for the chopper were changed as shown in Table 1.

Then, the mixing vessel was heated to dissolve and, simultaneously, knead the agar powder. The temperature was elevated from a room temperature to 95° C. for 30 min. While keeping the temperature of the material at 95° C., the planetary blade was rotated at a rotation speed of 30 rpm to knead the slurry (without rotating the chopper). Upon temperature elevation, rotation of the planetary blade was stopped. Kneading was conducted at 95° C. for 30 min, the resultant kneading product was cooled down to a room temperature to obtain a molding material. The molding material was taken out of the mixing vessel.

The molding material was pelleted while controlling the humidity so that the water content of the pellet was adjusted to 17.5%. The pellets after the humidity control was molded by an electromotive injection molding machine at 30 ton die clamping to mold flat plates each of 60 mm for each side and 6 mm in thickness. After drying the molding product at a room temperature over one day and one night, the residual water content was removed in a drying apparatus at 130° C., and it was sintered under the conditions at a temperature elevation rate of 300° C./hr, at a maximum temperature of 1620° C. for a retention time at 1620° C. of 2 hours. Cooling was conducted by spontaneous cooling. The resultant sintered body was fabricated and a test specimen sized 4 mm×3 mm×40 mm according to JIS (R1601) was cut out and density and 4-point bending strength were measured for the test specimen.

TABLE 1

| | rotation speed of planetary blade rpm | rotation speed of chopper rpm | residue on screen (parts by weight) | density of sintered body g/cc | four point bending strength MPa |
|---|---|---|---|---|---|
| example 1 | 10 | 1000 | 0.4 | 3.93 | 403 |
| example 2 | 10 | 3000 | 0.3 | 3.94 | 413 |
| example 3 | 25 | 1000 | 0.2 | 3.93 | 411 |
| example 4 | 25 | 3000 | 0.1 | 3.94 | 425 |
| example 5 | 50 | 1000 | 0.1 | 3.94 | 423 |
| example 6 | 50 | 3000 | 0.0 | 3.94 | 432 |
| comparative example 1 | 10 | 0 | 10 | 3.91 | 339 |
| comparative example 2 | 25 | 0 | 7 | 3.92 | 345 |
| comparative example 3 | 50 | 0 | 1.7 | 3.92 | 378 |

As can be seen from the results, the amount of residues on the screen when the slurry after mixing was passed through the screen in Examples 1 to 6 was remarkably reduced compared with Comparative Examples 1 to 3. In Comparative Examples 1 to 3, agglomerates suspended in the vicinity of the surface of the slurry and suspensions were adhered on the surface of the blade or on the inner wall surface of the mixing vessel. The adhesion were sprayed off into the mixing vessel and the mixing was tried again but the agglomerates were hard and could not be pulverized by the planetary blade. In Examples 1 to 6, such agglomerates were pulverized.

The density of each sintered body of Comparative Examples 1 to 3 was as large as about 3.92 g/cc, which was not substantially different from the density of each sintered body of Examples 1 to 6. This is because the amount of agar (organic material) in the mixture is small and most of the slurry comprises alumina powder. Indeed, it is considered that when agglomerates are formed in the slurry, scattering may occur in the amount of the alumina powder or agar also in the molded body. However, since agar is dissipated in the course of the sintering, it gives no substantial effect in view of the density of the entire sintered body. Accordingly, even when agglomerates are formed in the mixture, the density of the sintered body is scarcely lowered.

On the other hand, the strength of the sintered body has a close concern with the size, the shape and the frequency of occurrence of defects in the sintered body. It is considered that when the agglomerates are present in the slurry, the portions where agar and water are dissipated in the course of sintering remain as coarse portions or pores to act as defects. It is considered that such defects act as stress concentration sources, leading to deterioration of the strength.

Example 2

(Starting material powder)

As the starting material powder for agar, agar powders of each of kinds and jelly strength shown in Table 2 and Table 3 were used. Among them, "UM-11" is instantly soluble agar.

(Pre-treatment)

As the pre-treatment for the agar powder, one of the following methods was adopted.

(1) Water by 1 to 3 times the weight of agar was sprayed by using a sprayer and they were left as they were for 1 hour. The pre-treatment method is indicated in Table 2 and Table 3 as "water added (equivalent weight)" or "water added (three times by weight)".

(2) An agar powder was thinly scattered on a vat and maintained in a thermostable and humidity stable vessel at a temperature of 30° C. and at a relative humidity of 100% for 2 hour or 8 hours. The pre-treatment method is indicated in Table 2 and Table 3 as "vapor added".

(3) Ethanol was added by five times the weight of agar, and stirred lightly. The pre-treatment method is indicated in Table 2 and Table 3 as "ethanol added".

(4) An agar powder was charged in an aqueous 10 wt % solution of polyvinyl alcohol by ten times the weight of agar and then stirred lightly. It was filtered by using qualitative filter paper and the filtration product was dried at 80° C for 1 hour. The pre-treatment method is indicated in Table 2 and Table 3 as "coating".

(Measurement for absorption time)

The water absorption time of each agar powder was measured as described below. That is, the agar powder was thinly scattered on a vat, kept in a thermostable and humidity stable vessel at a temperature of 30° C. and at a relative humidity of 100%, and the time at the instance absorbing 5 wt % of water based on the initial weight was measured. As the absorption time is shorter, agglomerates tend to be formed more when the agar powder is charged into the slurry. Relation between the humidifying time and change of weight when "XG-89" (jelly strength 840 g/cm$^2$) was applied with various types of pre-treatments is shown in FIG. 1.

(Preparation of slurry of mixture)

As an alumina powder, 6000 g of an easily sinterable low soda alumina content powder ("AES11 C", manufactured by Sumitomo Chemical Industry Co., purity: 99.5%, BET specific surface area: 8 m$^2$/g, average particle size: 0.5 μm) was used. As a dispersant, 0.9% by weight of ammonium polyacrylate copolymer ("A-6114", manufactured by Toa Gosei Co., molecular weight: 10000 MW, pH: 7-9, 39-41% solution) was added based on the alumina powder, ion exchanged water was added so as to adjust the water content to 25% by weight and mixed thoroughly. Then, it was mixed for 12 hours in a pot mill using monomalon media as a pulverization media. The resultant slurry was passed through a screen having a wire diameter of 390 μm and a mesh of 600 μm (JIS Z8801) and then charged in a mixing vessel.

Each of the previously prepared agar powders was weighed at a ratio of 3 parts by weight (based on the weight of the agar powder before pre-treatment) based on 100 parts by weight of the alumina powder. While stirring the mixture, the agar powder was charged stepwise into the mixing vessel. 5 min after charging all the weighed agar powder, the lid of the mixing vessel was opened, solids adhered on the inner wall surface were sprayed off into the slurry and then mixed again for 5 min. The resultant slurry was passed on a screen having a wire diameter of 390 μm and a mesh of 600 μm (JIS Z8801) and the weight of solids remaining on the screen was measured. The solids were agglomerates.

(Heating and kneading)

Then, the mixing vessel was heated to dissolve and, simultaneously, knead the agar powder. The temperature was elevated from a room temperature to 95° C. for 30 min. While keeping the temperature of the material at 95° C., the slurry was kneaded. Kneading was conducted at 95° C. for 30 min, the resultant kneading product was cooled down to a room temperature to obtain a molding material. The molding material was taken out of the mixing vessel.

(Molding and sintering)

Figure 2:
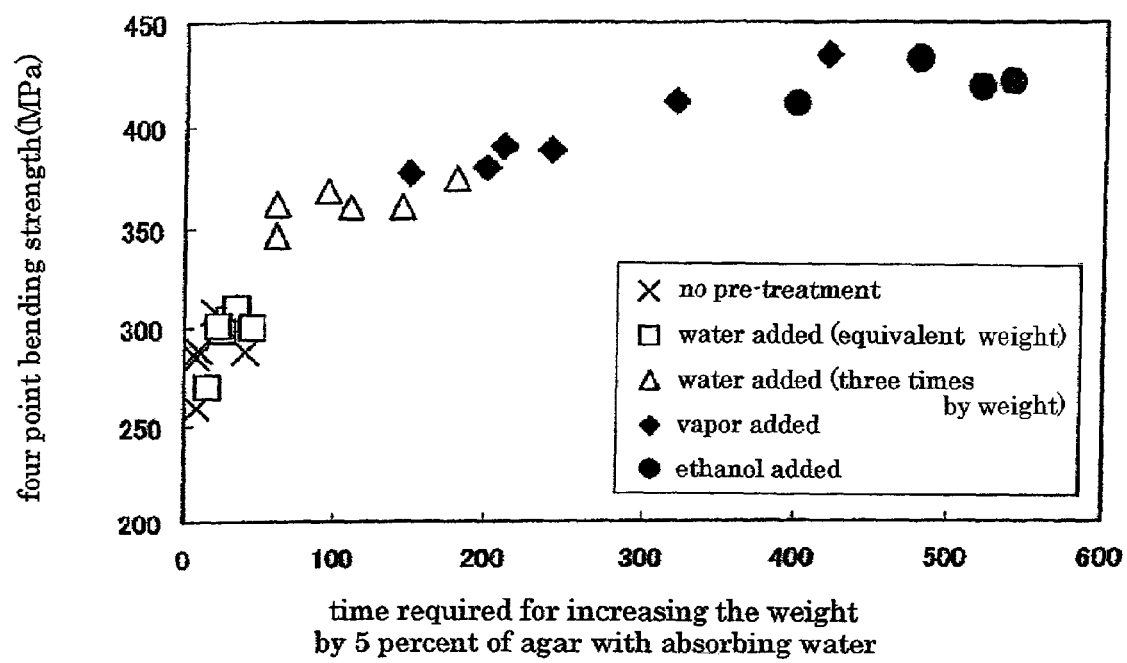
FIG. 2 is a graph showing a relation between the water absorption time for absorbing 5% by weight of water based on the initial weight and the 4-point bending strength.
Figure 3:
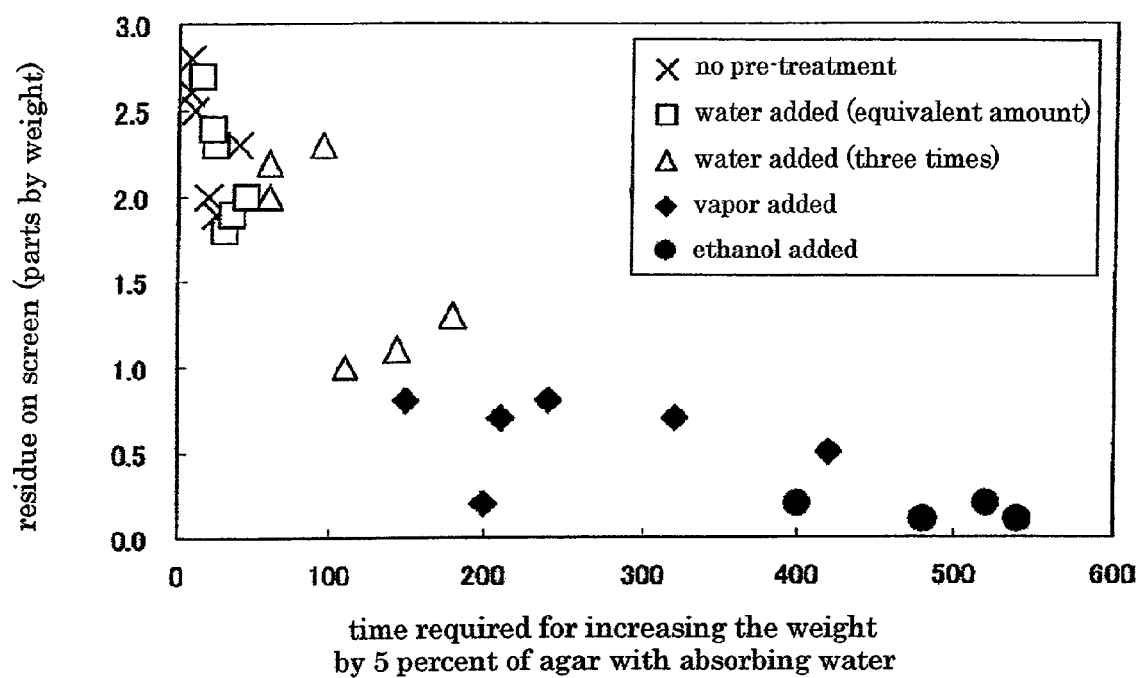
FIG. 3 is a graph showing a relation between the water absorption time for absorbing 5% by weight of water based on the initial weight and the residue on a screen (parts by weight).

The molding material was pelleted while controlling the humidity and the water content of the pellet was adjusted to 17% by weight. The pellets after humidity control was molded by an electromotive injection molding machine at 30 ton die clamping to mold flat plates each of 60 mm for each side and 6 mm in thickness. After drying the molding product at a room temperature over one day and one night, the residual water content was removed in a drier at 130° C., and it was sintered under the conditions at a temperature elevation rate of 300° C./hr, at a maximum temperature of 1620° C. for a retention time at 1620° C. of 2 hours. Cooling was conducted by spontaneous cooling. The resultant sintered body was fabricated and a test specimen sized 4 mm×3 mm×40 mm according to JIS (R1601) was cut out and density and 4-point bending strength were measured for the test specimen. The result of the measurement described above is shown in Table 2 and Table 3. Further, a relation between the water absorption time for absorbing 5% by weight of water based on the initial weight, and the 4-point bending strength is shown in FIG. 2, while a relation between the water absorption time for absorbing 5% by weight of water based on the initial weight, and the residues on the screen (parts by weight) is shown in FIG. 3.

TABLE 2

| | trade name | jelly strength g/c m$^2$ | pre-treatment of agar | time required for increasing the weight by 5 percent of agar with absorbing water | residue on screen (parts by weight) | density of sintered body g/cc | four point bending strength (Mpa) |
|---|---|---|---|---|---|---|---|
| Comparative example A1 | XG-89 | 840 | None | 25 | 1.9 | 3.93 | 300 |
| Comparative example A2 | XG-89 | 840 | Water added (equivalent weight) | 30 | 1.8 | 3.93 | 305 |
| example A3 | XG-89 | 840 | water added three times by weight | 180 | 1.3 | 3.93 | 374 |
| example A4 | XG-89 | 840 | vapor added | 420 | 0.5 | 3.94 | 434 |
| example A5 | XG-89 | 840 | ethanol added | 720 | 0.0 | 3.94 | 440 |
| example A6 | XG-89 | 840 | Coating | 620 | 0.1 | 3.93 | 428 |
| comparative example B1 | XG-171 | 870 | None | 20 | 2.0 | 3.92 | 308 |
| comparative example B2 | XG-171 | 870 | water added (equivalent weight) | 35 | 1.9 | 3.92 | 310 |
| example B3 | XG-171 | 870 | water added three times by weight | 145 | 1.1 | 3.92 | 360 |
| example B4 | XG-171 | 870 | vapor added | 240 | 0.8 | 3.92 | 388 |
| example B5 | XG-171 | 870 | ethanol added | 540 | 0.1 | 3.93 | 422 |

TABLE 2-continued

|  | trade name | jelly strength g/c m² | pre-treatment of agar | time required for increasing the weight by 5 percent of agar with absorbing water | residue on screen (parts by weight) | density of sintered body g/cc | four point bending strength (Mpa) |
|---|---|---|---|---|---|---|---|
| example B6 | XG-171 | 870 | Coating | 540 | 0.1 | 3.93 | 435 |
| comparative example C1 | XG-258 | 1350 | None | 10 | 2.5 | 3.91 | 289 |
| comparative example C2 | XG-258 | 1350 | water added (equivalent weight) | 25 | 2.3 | 3.92 | 299 |
| example C3 | XG-258 | 1350 | water added three times by weight | 95 | 2.3 | 3.91 | 368 |
| example C4 | XG-258 | 1350 | vapor added | 210 | 0.7 | 3.91 | 390 |
| example C5 | XG-258 | 1350 | ethanol added | 520 | 0.2 | 3.93 | 419 |
| example C6 | XG-258 | 1350 | Coating | 400 | 0.2 | 3.93 | 428 |

TABLE 2

|  | trade name | jelly strength g/c m² | pre-treatment of agar | time required for increasing the weight by 5 percent of agar with absorbing water | residue on screen (parts by weight) | density of sintered body g/cc | four point bending strength (Mpa) |
|---|---|---|---|---|---|---|---|
| comparative example D1 | XF-330 | 2100 | None | 8 | 2.6 | 3.91 | 285 |
| comparative example D2 | XF-330 | 2100 | water added (equivalent weight) | 22 | 2.4 | 3.92 | 301 |
| example D3 | XF-330 | 2100 | water added three times by weight | 60 | 2.0 | 3.92 | 362 |
| example D4 | XF-330 | 2100 | vapor added | 200 | 0.2 | 3.92 | 380 |
| example D5 | XF-330 | 2100 | ethanol added | 780 | 0.1 | 3.92 | 432 |
| example D6 | XF-330 | 2100 | Coating | 350 | 0.2 | 3.94 | 440 |
| comparative example E1 | UM-11 | 1040 | None | 8 | 2.8 | 3.91 | 260 |
| comparative example E2 | UM-11 | 1040 | water added (equivalent weight) | 15 | 2.7 | 3.91 | 270 |
| example E3 | UM-11 | 1040 | water added three times by weight | 60 | 2.2 | 3.91 | 346 |
| example E4 | UM-11 | 1040 | vapor added | 150 | 0.8 | 3.91 | 377 |
| example E5 | UM-11 | 1040 | ethanol added | 400 | 0.2 | 3.92 | 411 |
| example E6 | UM-11 | 1040 | Coating | 500 | 0.1 | 3.94 | 425 |
| comparative example F1 | Daiwa | 430 | None | 40 | 2.3 | 3.92 | 288 |
| comparative example F2 | Daiwa | 430 | water added (equivalent weight) | 45 | 2.0 | 3.92 | 300 |
| example F3 | Daiwa | 430 | water added three times by weight | 110 | 1.0 | 3.93 | 360 |
| example F4 | Daiwa | 430 | vapor added | 320 | 0.7 | 3.93 | 412 |
| example F5 | Daiwa | 430 | ethanol added | 720 | 0.0 | 3.93 | 432 |
| example F6 | Daiwa | 430 | coating | 610 | 0.1 | 3.93 | 436 |

As shown in Table 2, when the slurry after the mixing was passed through the screen, the amount of residues on the screen was reduced in Examples A3, A4, A5 and A6 compared with those in Comparative Examples A1 and A2. Particularly, in Example A5, since ethanol intrudes into molecules of agar and further causes swelling by substitution with water, it no more absorbs water rapidly and forms less agglomerates. Then, the strength of the sintered body was remarkably improved in Examples A3, A4, A5 and A6 compared with Comparative Examples 1 and 2. On the other hand, the density of the sintered body was not substantially changed among the Examples A1 to A6.

The reason is considered as below. Since agar is lost in the course of sintering, agar has no concerns with the lowering of the density of the sintered body also in a case where agar has caused agglomeration. On the other hand, the strength of the sintered body has a close concern with the size, the shape and the frequency of occurrence of defects in the sintered body. It is considered that when the agglomerates are present in the slurry, the portions where agar and water are dissipated in the course of sintering remain as coarse portions or pores to act as defects. Such defects acts as stress concentration sources, leading to deterioration of the strength.

Further, similar effects were also obtained in a case of comparison between Comparative Examples B1 and B2 with Examples B3, B4, B5 and B6, between Comparative Examples C1 and C2 with Examples C3, C4, C5 and C6, between Comparative Examples D1 and D2 with Examples D3, D4, D5 and D6, between Comparative Examples E1 and E2 with Examples E3, E4, E5 and E6, and between Comparative Examples F1 and F2 with Examples F3, F4, F5 and E6.

As can be seen from the result described above, when the water absorption amount till the instance absorbing 5% by weight of the water based on the initial weight is less than 50 min, the strength is as low as less than 310 MPa, while in a case where the water absorption time is 50 to 250 min, the strength increases as 360 to 390 MPa. Further, when the water absorption time is 250 min or more, the strength further increases as 410 to 436 MPa.

The invention claimed is:

1. A method of manufacturing a sintered body, said method comprising the steps of:
    pretreating agar powder, before adding said agar powder to a first mixture, by adding a pretreatment agent selected from the group consisting of water, a hydrophilic solvent, and a mixture of water and a hydrophilic solvent to said agar powder to provide a pretreated agar powder which requires at least 50 minutes in an atmosphere at a temperature of 30° C. and at a relative humidity of 100% to increase a weight of said pretreated agar powder by 5%;
    then adding said pretreated agar powder to said first mixture which comprises at least a ceramic molding powder and a solvent;
    then mixing said pretreated agar powder and said first mixture at a temperature not higher than a dissolving point of said pretreated agar powder to obtain a second mixture;

then heating and kneading said second mixture at a temperature not lower than said dissolving point of said pretreated agar powder thereby forming a sol;

then forming a molded body using said sol; and then sintering said molded body to provide a sintered body.

2. The method of claim 1, wherein said step of obtaining a molding material from said sol comprises a step of cooling said sol to a temperature not higher than a gel point of said pretreated agar powder to produce a gel that is used as said molding material.

3. The method of claim 1, wherein said step of obtaining a molding material from said sol does not include performing a step of producing a gel from said sol.

4. The method of claim 1, wherein said pretreatment agent is sprayed to said agar powder to provide said pretreated agar powder.

5. The method of claim 1, wherein said agar powder is maintained in an atmosphere with a high humidity so as to add water as said pretreatment agent to said agar powder to provide said pretreated agar powder.

* * * * *